US012680509B2

(12) United States Patent (10) Patent No.: US 12,680,509 B2
Chaudhari et al. (45) Date of Patent: Jul. 14, 2026

(54) POWER TRANSFER SYSTEM FOR A GAS TURBINE ENGINE

(71) Applicants: General Electric Company, Schenectady, NY (US); General Electric Deutschland Holding GmbH, Frankfurt (DE)

(72) Inventors: Pushkar Chandrakant Chaudhari, Bengaluru (IN); Suma Mn, Bengaluru (IN); Mohamed Osama, Garching (DE); Kevin Michael Do, Cincinnati, OH (US)

(73) Assignees: General Electric Company, Schenectady, NY (US); General Electric Deutschland Holding GmbH, Frankfurt (DE)

( * ) Notice: Subject to any disclaimer, the term of this patent is extended or adjusted under 35 U.S.C. 154(b) by 0 days.

(21) Appl. No.: 19/036,129

(22) Filed: Jan. 24, 2025

(65) Prior Publication Data

US 2025/0283435 A1 Sep. 11, 2025

(30) Foreign Application Priority Data

Mar. 6, 2024 (IN) .............................. 202411015770

(51) Int. Cl.
*F02C 7/36* (2006.01)
*F01D 15/10* (2006.01)
(Continued)

(52) U.S. Cl.
CPC ................ *F02C 7/36* (2013.01); *F01D 15/10* (2013.01); *F02C 6/00* (2013.01); *H02P 7/343* (2013.01);
(Continued)

(58) Field of Classification Search
CPC .... F02C 7/36; F02C 6/00; F02C 3/113; F01D 15/10; H02P 7/343; H02P 2101/25;
(Continued)

(56) References Cited

U.S. PATENT DOCUMENTS

| | | | |
|---|---|---|---|
| 3,167,911 A | 2/1965 | Sandre | |
| 6,968,701 B2 | 11/2005 | Glahn et al. | |

(Continued)

FOREIGN PATENT DOCUMENTS

| | | |
|---|---|---|
| EP | 0043554 A1 | 1/1982 |
| FR | 3133643 A1 | 9/2023 |

OTHER PUBLICATIONS

Extended European Search Report received for European Application No. 25157172.5, mailed on Jul. 14, 2025, 10 pages.
(Continued)

*Primary Examiner* — Aaron R Eastman

(74) *Attorney, Agent, or Firm* — Smith, Gambrell & Russell, LLP

(57) ABSTRACT

A gas turbine engine having a first pressure spool and a second pressure spool includes a power transfer system to transfer mechanical power between the first pressure spool and the second pressure spool. The first pressure spool can include a first electric machine to convert mechanical power from the first pressure spool to a first electric power. A coupled electric machine having a first coupled rotor and a second coupled rotor can be rotatingly coupled to the first pressure spool and the second pressure spool, respectively. The coupled electric machine is configured to receive an output power (e.g., an output power from an AC/AC converter) to drive a winding of the coupled electric machine to enable power transfer between the first pressure spool and (Continued)

the second pressure spool. An AC/AC converter can be electrically disposed between the first pressure spool and the second pressure spool.

20 Claims, 11 Drawing Sheets

(51) Int. Cl.

| | |
|---|---|
| *F02C 6/00* | (2006.01) |
| *H02P 7/343* | (2016.01) |
| *H02P 101/25* | (2016.01) |
| *H02P 103/20* | (2016.01) |

(52) U.S. Cl.
CPC .. *F05D 2220/76* (2013.01); *F05D 2260/4031* (2013.01); *H02P 2101/25* (2015.01); *H02P 2103/20* (2015.01); *H02P 2207/03* (2013.01)

(58) Field of Classification Search
CPC ............. H02P 2103/20; H02P 2207/03; F05D 2220/76; F05D 2260/4031; F05D 2220/764; F05D 2220/768; F05D 2260/404; B64D 31/18; F02K 5/00; H02K 7/1823
See application file for complete search history.

(56) References Cited

U.S. PATENT DOCUMENTS

| | | | | |
|---|---|---|---|---|
| 9,045,996 | B2 * | 6/2015 | Anghel | ..................... F02C 7/36 |
| 9,102,227 | B2 | 8/2015 | Yang et al. | |
| 10,787,967 | B2 * | 9/2020 | Gieras | ..................... F01D 15/10 |
| 11,053,891 | B2 | 7/2021 | Brandstein et al. | |
| 11,362,567 | B2 * | 6/2022 | Liu | ..................... H02K 16/025 |
| 2005/0077800 | A1 * | 4/2005 | Hoeijmakers | .......... B60K 6/448 |
| | | | | 903/906 |
| 2007/0090707 | A1 * | 4/2007 | Moriya | ..................... B60L 7/14 |
| | | | | 310/112 |
| 2008/0136189 | A1 * | 6/2008 | Qu | .......................... H02K 49/02 |
| | | | | 310/68 B |
| 2011/0024567 | A1 * | 2/2011 | Blackwelder | ........... F02K 3/072 |
| | | | | 310/58 |
| 2012/0326539 | A1 * | 12/2012 | Webster | ............... H02K 7/1838 |
| | | | | 310/46 |
| 2015/0244240 | A1 | 8/2015 | Fuchi et al. | |
| 2018/0291807 | A1 | 10/2018 | Dalal | |
| 2019/0136768 | A1 | 5/2019 | Harvey | |
| 2021/0226509 | A1 | 7/2021 | Liu | |
| 2023/0139984 | A1 * | 5/2023 | Hindle | .................... B64C 19/00 |
| | | | | 244/58 |

OTHER PUBLICATIONS

Bozhko et al., Concept of Electrical Power Transfer for Turbofan Engine Performance Enhancement, Electric & Hybrid Aerospace Technology Symposium, Institute for Aerospace Technology (IAT), Cologne Germany, 2019.

Lang et al., A Dual-Channel-Enhanced Power Generation Architecture With Back-to-Back Converter for MEA Application, IEEE Transactions on Industry Applications, vol. 56, Issue 3, May-Jun. 2020, 3006-3019.

* cited by examiner

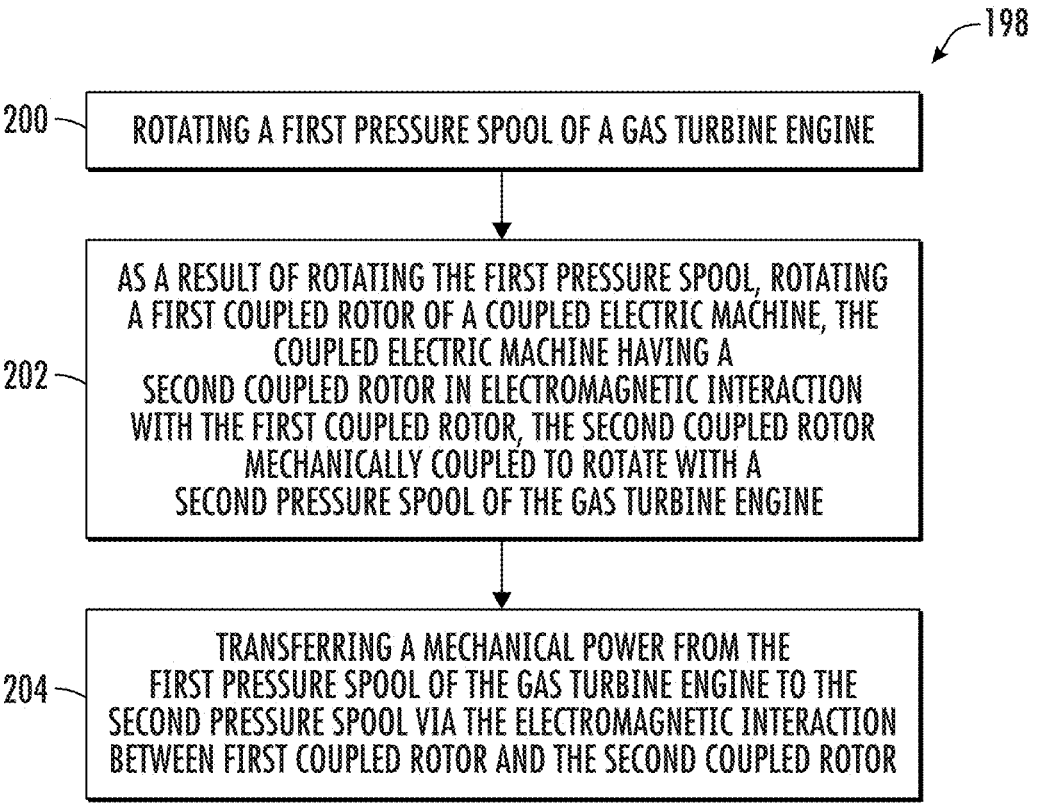

198

200 — ROTATING A FIRST PRESSURE SPOOL OF A GAS TURBINE ENGINE

202 — AS A RESULT OF ROTATING THE FIRST PRESSURE SPOOL, ROTATING A FIRST COUPLED ROTOR OF A COUPLED ELECTRIC MACHINE, THE COUPLED ELECTRIC MACHINE HAVING A SECOND COUPLED ROTOR IN ELECTROMAGNETIC INTERACTION WITH THE FIRST COUPLED ROTOR, THE SECOND COUPLED ROTOR MECHANICALLY COUPLED TO ROTATE WITH A SECOND PRESSURE SPOOL OF THE GAS TURBINE ENGINE

204 — TRANSFERRING A MECHANICAL POWER FROM THE FIRST PRESSURE SPOOL OF THE GAS TURBINE ENGINE TO THE SECOND PRESSURE SPOOL VIA THE ELECTROMAGNETIC INTERACTION BETWEEN FIRST COUPLED ROTOR AND THE SECOND COUPLED ROTOR

FIG. 10

POWER TRANSFER SYSTEM FOR A GAS TURBINE ENGINE

FIELD

The present application claims priority to Indian Provisional Patent Application No. 202411015770 filed on Mar. 6, 2024.

FIELD

The present disclosure relates to a power transfer system for a gas turbine engine.

BACKGROUND

Aeronautical vehicles use a variety of power sources to drive one or more propulsors that may generate thrust for the vehicles. Many vehicles use gas turbine engines, having two or more spools of a turbomachine which may include one or more electric machines that operate with the spools. For example, an electric machine can be driven by a low pressure spool of the gas turbine engine to generate an electric power that can be used elsewhere in the aeronautical vehicle. While gas turbine engines have advanced significantly over the years, it may be beneficial to examine inclusion of other electric machines with the gas turbine engine. However, in the process of integrating new electric machines, it may be important to make sure the new technologies do not create other inefficiencies in the form of excess weight, or the like. Improvements to the integration of electric machines would be useful in the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 10 is a flow diagram of a method of operating a power transfer system of the present disclosure.

DETAILED DESCRIPTION

Figure 1:
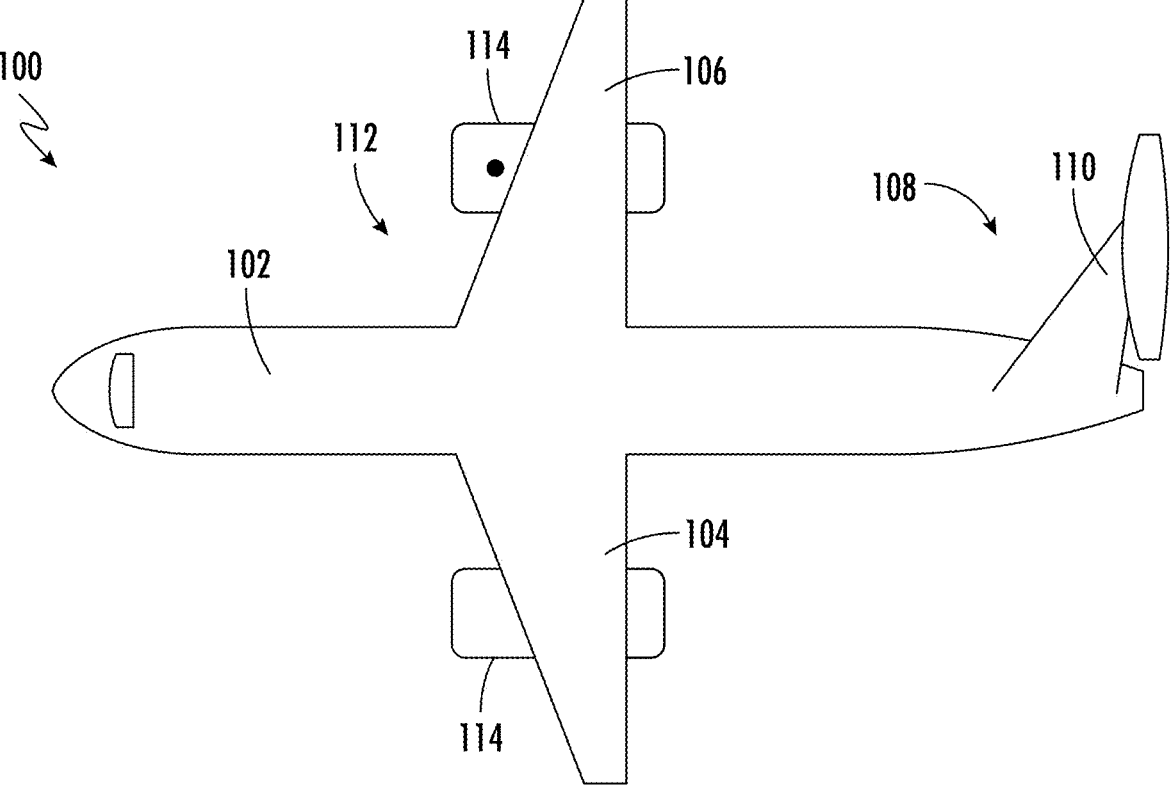
FIG. 1 is schematic, perspective view of an aeronautical vehicle in accordance with an aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The phrases "from X to Y" and "between X and Y" each refers to a range of values inclusive of the endpoints (i.e., refers to a range of values that includes both X and Y).

The present disclosure is generally related to a power transfer system for a gas turbine engine, in which the gas turbine engine includes two or more spools (e.g., two or more shafts respectively connecting two or more turbine and compressor elements). An electric machine can be coupled to a first pressure spool of the gas turbine engine (e.g., a low pressure shaft rotatingly coupled to a low pressure compressor and low pressure turbine) The electric machine can be configured to operate as a generator in which mechanical power is extracted from the first pressure spool and converted into electric power. A coupled electric machine can be coupled to both the first pressure spool and a second pressure spool of the gas turbine engine, where the second pressure spool can be, for example, a high pressure shaft rotatingly coupled to a high pressure compressor and high pressure turbine. The coupled electric machine can be a dual rotor electric machine having a first coupled rotor rotatingly coupled to the first pressure shaft and a second coupled rotor rotatingly coupled to the second pressure shaft. The coupled electric machine can include an armature winding on one of the first coupled rotor or second coupled rotor, and a permanent magnet on the other of the first coupled rotor or second coupled rotor. Electric current in the armature winding and relative motion between the first coupled rotor and second coupled rotor can facilitate mechanical power transfer between the first pressure spool and second pressure spool.

Electric power generated by the first electric machine as a result of extracting mechanical power from the first pressure spool can be provided to the coupled electric machine to enable the transfer of mechanical power between spools. An AC/AC (alternating current/alternating current) converter can be electrically disposed between the first electric machine and the coupled electric machine to facility conversion of AC power generated by the electric machine and AC power used to power the coupled electric machine. If power transfer is needed between the first pressure spool and the second pressure spool, a controller can be used to regulate operation of the AC/AC converter. The AC/AC converter can include an AC/DC (alternating current/direct current) converter for receiving a first power output from the first electric machine and converting it to DC power. The AC/AC converter can also include a DC/AC converter for converting the DC power to suitable AC power for use by the coupled electric machine. A DC link capacitor can be used to electrically couple the AC/DC converter and DC/AC converter. The controller can control operation of one or more discrete elements in the AC/AC converter (e.g., a switch) to control power extraction from the first electric machine, and can further control one or more discrete elements in the AC/AC converter (e.g., a switch) to control power delivery to the coupled electric machine.

Referring now to the drawings, wherein identical numerals indicate the same elements throughout the figures, FIG. 1 is a schematic view of an aeronautical vehicle 100 in accordance with an exemplary embodiment of the present disclosure. The exemplary aeronautical vehicle 100 of FIG. 1 is configured as an aircraft. The aircraft generally includes a fuselage 102 forming a main body portion of the vehicle 100, a first wing 104 extending from a port side of the aircraft and a second wing 106 extending from a starboard side of the aircraft. The first and second wings 104, 106 each extend laterally from the fuselage 102. The aircraft further includes an empennage 108 having one or more stabilizer 110, and, in particular, including a vertical stabilizer and a horizontal stabilizer. As will be appreciated, the aircraft can take the form of any suitable aeronautical vehicle, including, but not limited to, a rotary aircraft (e.g., a helicopter). The vehicle 100 further includes a propulsion system 112 that includes one or more propulsors 114.

Figure 2:
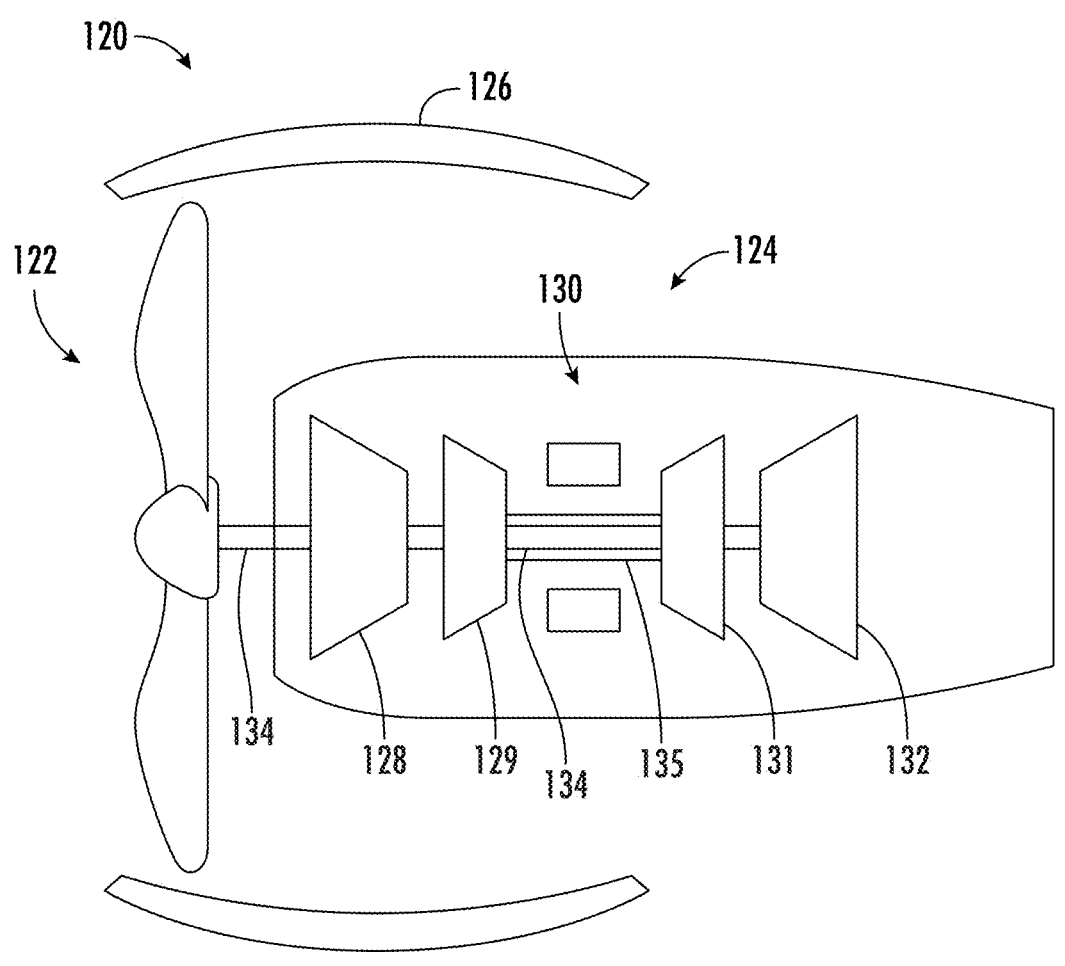
FIG. 2 is a schematic view of a gas turbine engine in accordance with an aspect of the present disclosure.
Figure 11:
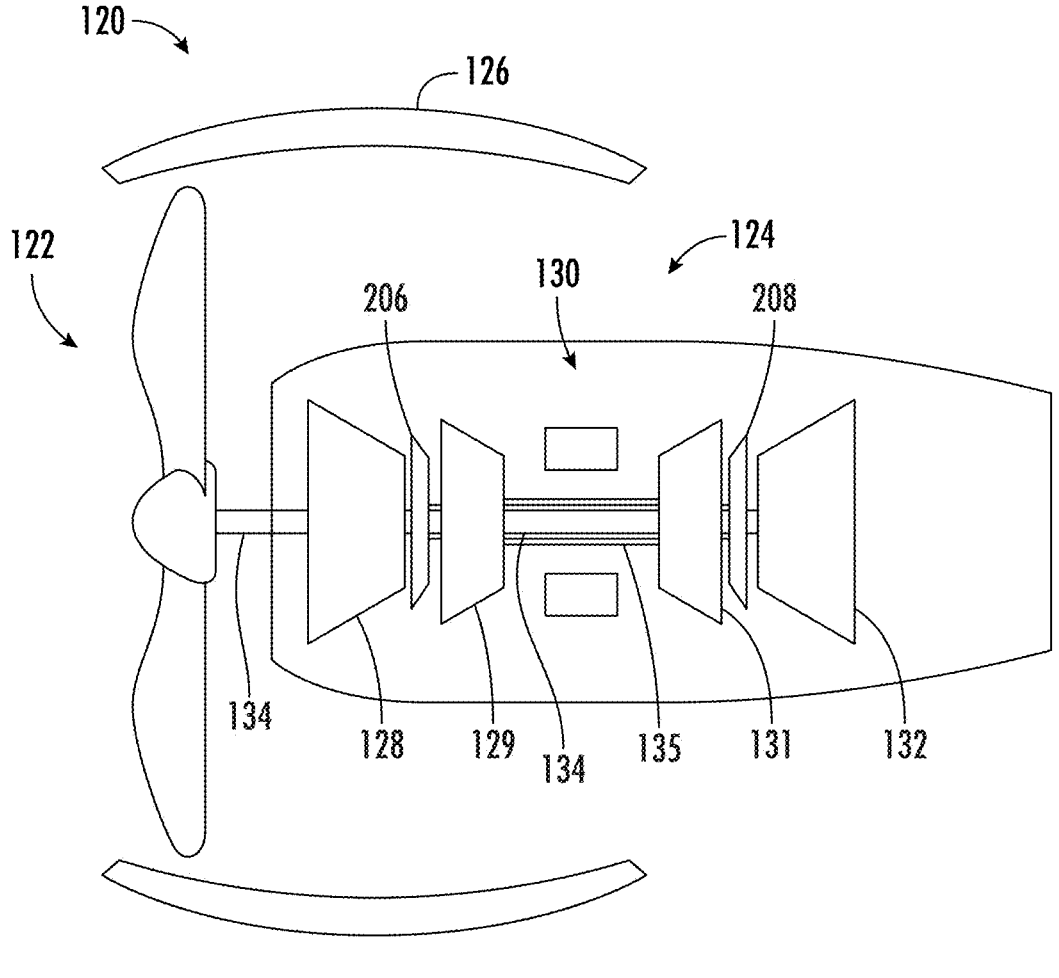
FIG. 11 is a schematic view of a gas turbine engine in accordance with an aspect of the present disclosure

Referring now to FIG. 2, a schematic view of a propulsor as may be incorporated into the exemplary propulsion system 112 of the vehicle 100 of FIG. 1 is provided. More specifically, for the embodiment depicted in FIG. 2, the propulsor is configured as a gas turbine engine 120, and more specifically, still, the gas turbine engine 120 of FIG. 2 is configured as a turbofan engine. The turbofan engine includes a fan 122 and a turbomachine 124 drivingly coupled to the fan 122. The turbofan engine further includes an outer nacelle 126 enclosing at least in part the fan 122 and the turbomachine 124. The turbomachine 124 of the illustrated embodiment can include a low pressure (LP) compressor 128, a high pressure (HP) compressor 129, a combustor 130, an HP turbine 131, and a LP turbine 132 arranged in serial flow order. The fan 122, LP compressor 128, and LP turbine 132 are rotatingly coupled via a LP shaft 134. The HP compressor 129 and HP turbine 131 are rotatingly coupled via an HP shaft 135. The fan 122, LP compressor 128, and LP turbine 132, rotatingly coupled via the LP shaft 134, is generally referred to as a LP spool of the gas turbine engine 120. The HP compressor 129 and HP turbine 131, rotatingly coupled via the HP shaft 135, are generally referred to as an HP spool of the gas turbine engine 120. Though the gas turbine engine 120 of the illustrated embodiment includes a core flow path of working fluid through the HP spool and a bypass flow path of working fluid generated by the fan 122 through a bypass flow path, in other embodiments the gas turbine engine 120 can include additional streams of working fluid, such as a so-called third stream. Additionally and/or alternatively, the gas turbine engine 120 can include an intermediate pressure (IP) spool having an IP compressor and IP turbine (see, e.g., FIG. 11 illustrating an IP spool having an IP compressor 206 and IP turbine 208).

Figure 3:
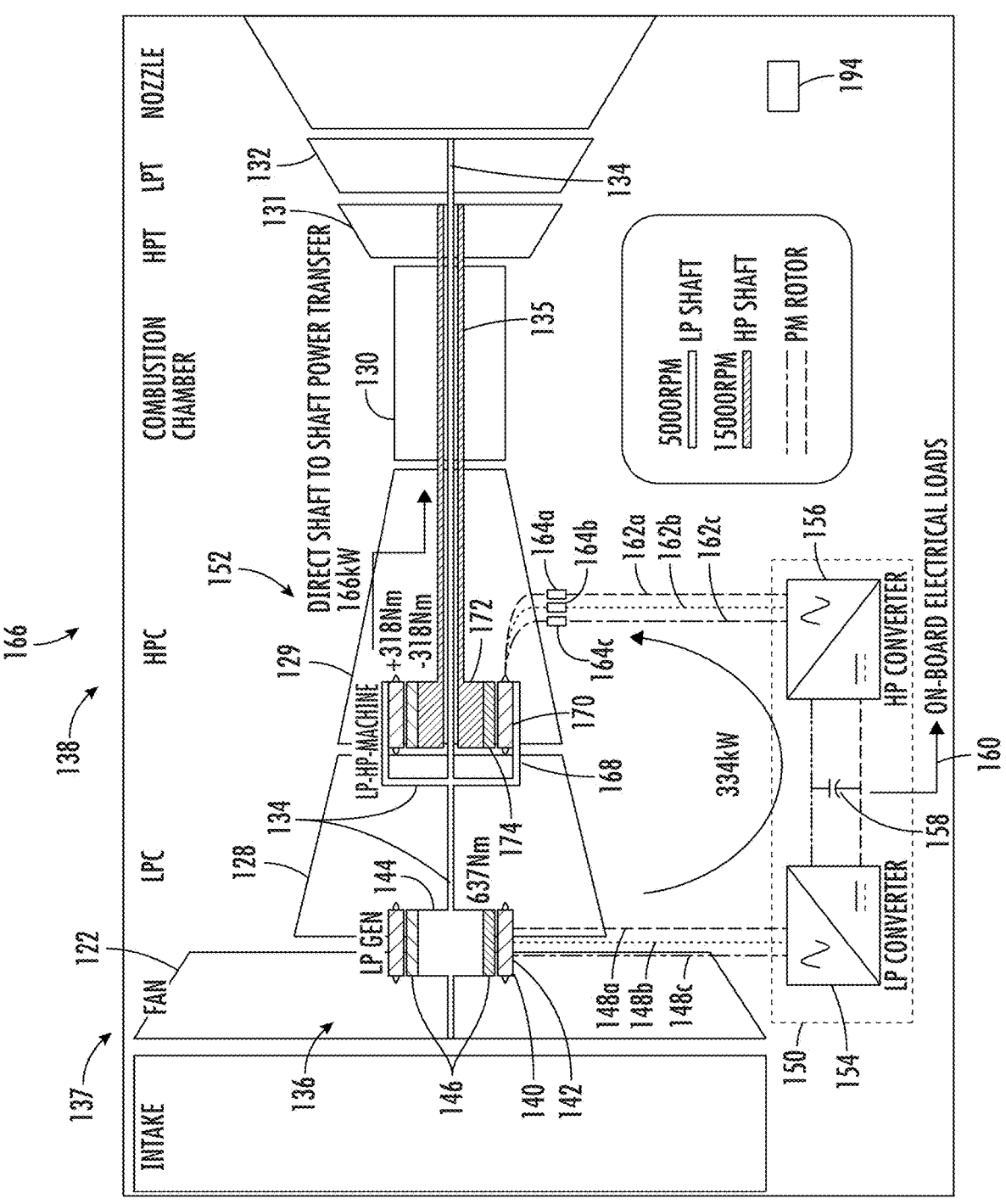
FIG. 3 is a schematic view of a power transfer system in accordance with an aspect of the present disclosure.

Turning now to FIG. 3, one embodiment of the gas turbine engine 120 is illustrated which includes a power transfer system 137 useful to extract mechanical power from one spool of the gas turbine engine and transfer the mechanical power to another spool of the gas turbine engine via an electromagnetic interaction as will be discussed further below. The power transfer system 137 can include a first electric machine 136 rotatingly coupled to a first pressure spool 138 which, in the illustrated embodiment, is the LP spool (e.g., the LP compressor 128, LP turbine 132, and LP shaft 134). In other embodiments, the first pressure spool 138 can be the HP spool or the IP spool. When the first pressure spool 138 is in the form of the LP spool, a first pressure shaft of the first pressure spool 138 corresponds to the LP shaft 134. Similarly, when the first pressure spool 138 is in the form of the HP spool, a first pressure shaft of the first pressure spool 138 corresponds to the HP shaft 135. The first electric machine 136 is depicted as integrated directly into the LP shaft 134 and radially inward of a working flow path of the fan 122 and/or LP compressor 128, in some embodiments, an offtake shaft can be rotatingly coupled to the LP shaft 134 and oriented in a radial direction so as to place the first electric machine 136 offset from the LP shaft 134. For example, an offtake shaft can be coupled at a first end via a gearing (e.g., a bevel gear) and oriented in a radial direction to place the first electric machine 136 at a location radially outward of a working flow path of the fan 122 and/or LP compressor 128. In some embodiments, a clutch can be coupled between the first electric machine 136 and the LP shaft 134.

The electric machine 136 includes a first stator 140 having at least one first winding 142, and a first rotor 144 having at least one first permanent magnet 146. The first stator 140 can be fixed to the gas turbine engine 120 such that it remains stationary relative to the rotating LP shaft 134. When operated as an electric generator, the first rotor 144 is configured to rotate in response to rotation of the LP shaft 134, where relative rotation of the at least one first permanent magnet 146 induces, via an electromagnetic interaction of the first stator 140 with the first rotor 144, an electric current in the at least one first winding 142 of the first electric machine 136. When operated as an electric motor, excitation of the at least one first winding 142 generates a magnetic field which interacts with the magnetic field of the at least one first permanent magnet 146. Interaction of the magnetic field creates a force upon the at least one first permanent magnet 146 which, in turn, creates a reactive force upon the LP shaft 134. The LP shaft 134 can be accelerated by using the first electric machine 136 as a motor, and can be decelerated by using the first electric machine 136 as a generator.

In the illustrated embodiment, the at least one first winding 142 of the first electric machine 136 includes three different and electrically separate first windings 142 to provide a three phase electric power. The three different and electrically separate first windings 142 of the first stator 140 are electrically coupled, respectively, to first power line 148a, first power line 148b, and first power line 148c.

As a result of relative motion between the first rotor 144 and first stator 140, the first electric machine 136 of the illustrated embodiment is configured to generate first electric power that is delivered to an Alternating Current/Alternating Current (AC/AC) converter 150. The AC/AC converter 150 is, in turn, configured to convert the first electric power to an output electric power, and deliver the output electric power to a coupled electric machine 152. As will be appreciated, the AC/AC converter 150 can be configured to receive three phase power (e.g., the first electric power) from the first electric machine 136 via the first power line 148a, first power line 148b, and first power line 148c, convert the three phase power to a three phase output power (e.g., the output electric power) to be provided to the coupled electric machine 152.

In one form, the AC/AC converter 150 can include an AC/DC converter 154 and a Direct Current/Alternating Current (DC/AC) converter 156 coupled together via a DC link capacitor 158. The AC/DC converter 154 is configured to receive AC power (e.g., the first electric power) via the first power line 148*a*, first power line 148*b*, and first power line 148*c*, and convert the AC power to DC power which is provided, via the DC link capacitor 158, to the DC/AC converter 156. One or more electrical loads associated with operation of the aircraft 100 can receive DC power 160. For example, electrical loads such as avionics, heaters, sensors, etc. can be powered either directly by DC power 160, or indirectly through an additional DC/AC converter (not illustrated).

DC/AC converter 156 is structured to receive DC power via the DC link capacitor 158, convert the DC power to three phase AC power, and provide three phase power (e.g., the output electrical power) to the coupled electric machine 152 via output power line 162*a*, output power line 162*b*, and output power line 162*c*. Each of output power line 162*a*, output power line 162*b*, and output power line 162*c* can be coupled to the coupled electric machine 152 via slip ring 164*a*, slip ring 164*b*, and slip ring 164*c*, respectively. Slip ring 164*a*, slip ring 164*b*, and slip ring 164*c* can take any suitable electrically conductive form useful to transfer electric power from output power line 162*a*, output power line 162*b*, and output power line 162*c* to the coupled electric machine 152.

Figure 4:
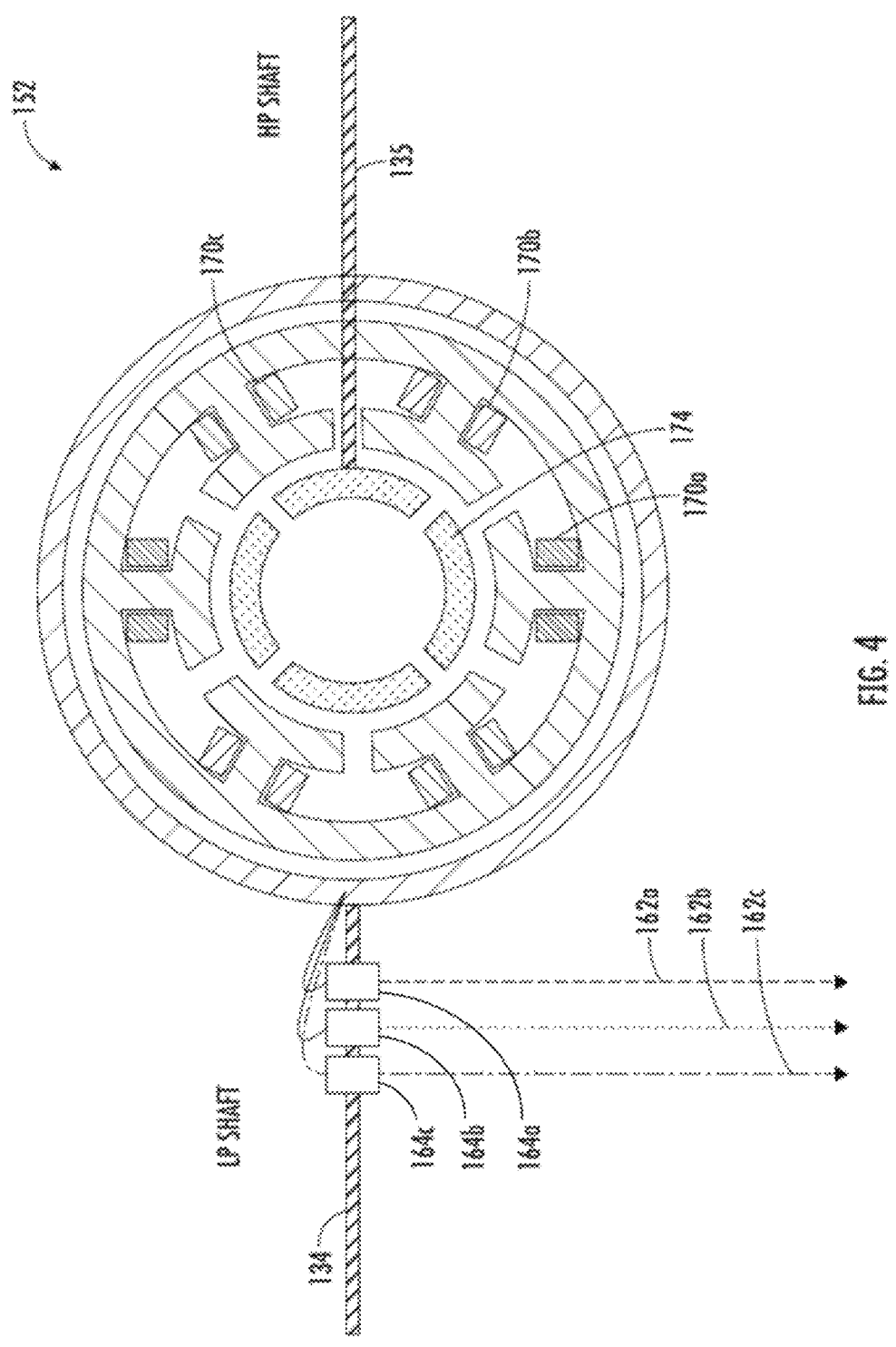
FIG. 4 is a schematic view of a coupled electric machine in accordance with an exemplary aspect of the present disclosure.

Turning now to FIG. 4, one embodiment of the coupled electric machine 152 is illustrated which includes output power line 162*a*, output power line 162*b*, and output power line 162*c* electrically coupled with the coupled electric machine 152 via slip ring 164*a*, slip ring 164*b*, and slip ring 164*c*. Each of coupled winding 170*a*, coupled winding 170*b*, and coupled winding 170*c* is provided electric power from the output power line 162*a*, output power line 162*b*, and output power line 162*c* via the slip ring 164*a*, slip ring 164*b*, and slip ring 164*c*.

Returning to FIG. 3, the electric machine 152 is a dual rotor electric machine rotatingly coupled to both the first pressure spool 138 and a second pressure spool 166 which, in the illustrated embodiment, is the HP spool (e.g., the HP compressor 129, HP turbine 131, and HP shaft 135). In other embodiments, the second pressure spool 166 can be the LP spool or the IP spool. The coupled electric machine 152 includes a first coupled rotor 168 having at least one coupled winding 170 and a second coupled rotor 172 having at least one coupled permanent magnet 174. The first coupled rotor 168 is configured to rotate with rotation of the LP shaft 134, and the second coupled rotor 172 is configured to rotate with rotation of the HP shaft 135. When operated as a motor, electric excitation of the at least one coupled winding 170 of the first coupled rotor 168 creates a magnetic field which interacts with a magnetic field of the at least one coupled permanent magnet 146 of the second coupled rotor 172. The electromagnetic interaction between the first coupled rotor 168 and second coupled rotor 172 permits mechanical power to be transferred between the LP shaft 134 and HP shaft 135. Excitation of the at least one coupled winding 170 can permit mechanical power to be transferred between the LP shaft 134 and HP shaft 135 via electromagnetic interaction of the first coupled rotor 168 and second coupled rotor 172. Given the nature of the excitation signal to the at least one coupled winding 170, mechanical power can be transferred from the LP shaft 134 to the HP shaft 135 in one form, and can be transferred from the HP shaft 135 to the LP shaft 134 in another form. In the illustrated embodiment, it is contemplated that mechanical power, via electromagnetic interaction of the first coupled rotor 168 and second coupled rotor 172, is transferred from the LP shaft 134 to the HP shaft 135.

When operated as a generator, rotation of the at least one coupled permanent magnet 146 induces electric excitation of the at least one coupled winding 170 of the first coupled rotor 168. The electromagnetic interaction between the first coupled rotor 168 and second coupled rotor 172 permits mechanical power to be transferred between the LP shaft 134 and HP shaft 135.

The power transfer system 137 illustrated in FIG. 3 is capable of transferring a mechanical power that includes a first portion transferred between the first pressure spool 138 and the second pressure spool 166 via electromagnetic interaction between the first coupled rotor 168 and the second coupled rotor 172, and includes a second portion transferred between the first pressure spool 138 and the second pressure spool 166 via the AC/AC electric converter 150. In one form, the first portion provided by the power transfer system 137 is 166 kW of power is transferred via shaft to shaft interaction, while the second portion provided by the power transfer system 137 is 334 kW of power via the AC/AC converter 150 which is provided to power the at least one coupled winding 170.

Although the power transfer system 137 is illustrated with three phase power from the first electric machine 136 being converted to three phase power to the coupled electric machine 152 via the AC/AC converter 150, it will be appreciated that different power formats are also contemplated such as single phase AC current and other polyphase AC electric power.

Figure 5:
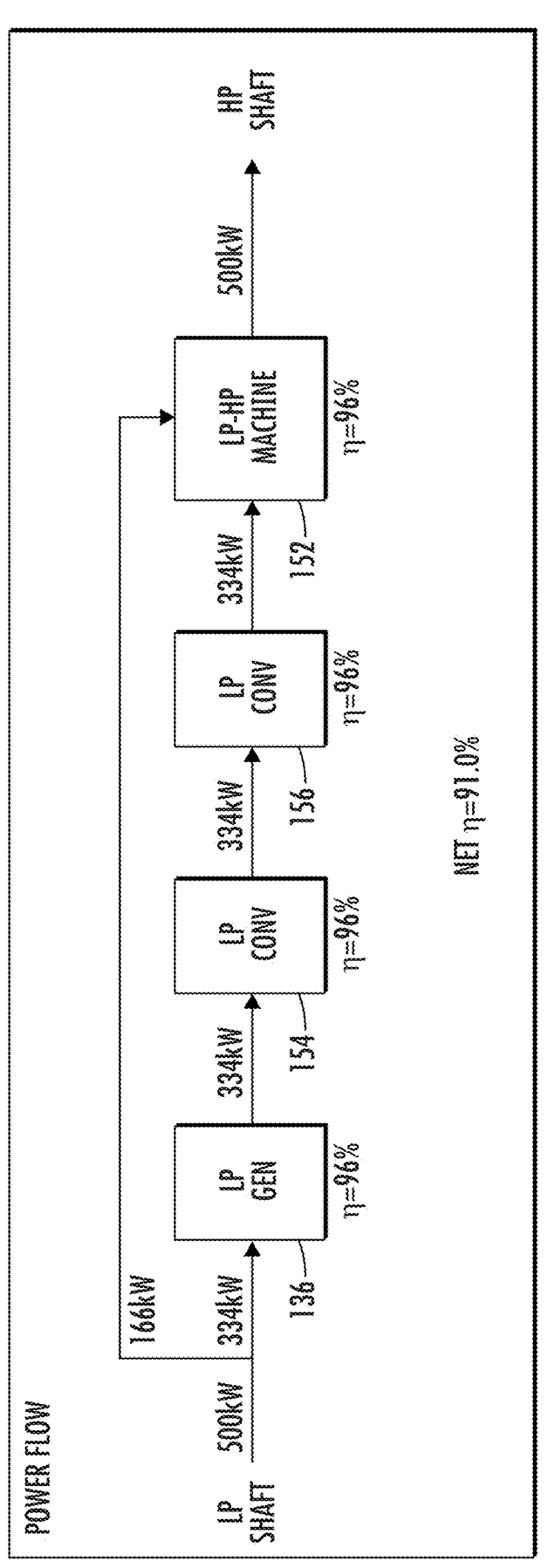
FIG. 5 is a power flow diagram of an embodiment of a power transfer system in accordance with an exemplary aspect of the present disclosure.

FIG. 5 depicts a power flow diagram of one form of power transfer system 137 of FIG. 3 in which the first portion of mechanical power provided by the power transfer system 137 is 166 kW of power transferred via shaft to shaft interaction, while the second portion of mechanical power provided by the power transfer system 137 is 334 kW of power via the AC/AC converter 150 which is provided to power the at least one coupled winding 170. Since only some of the power transfer is performed via electric power transfer from the first electric machine 136, AC/DC converter 154, DC/AC converter 156, and coupled electric machine 152, the overall efficiency of the system is 91%. Other efficiencies are also contemplated in other embodiments having different power transfer amounts (e.g., an efficiency in the ranges from 85%-95%). The level of efficiency of the power transfer system 137 depicted in FIG. 5 exceeds an efficiency of a system having a conventional electric machine on the LP shaft 134, and a conventional electric machine on the HP shaft 135.

Figure 6:
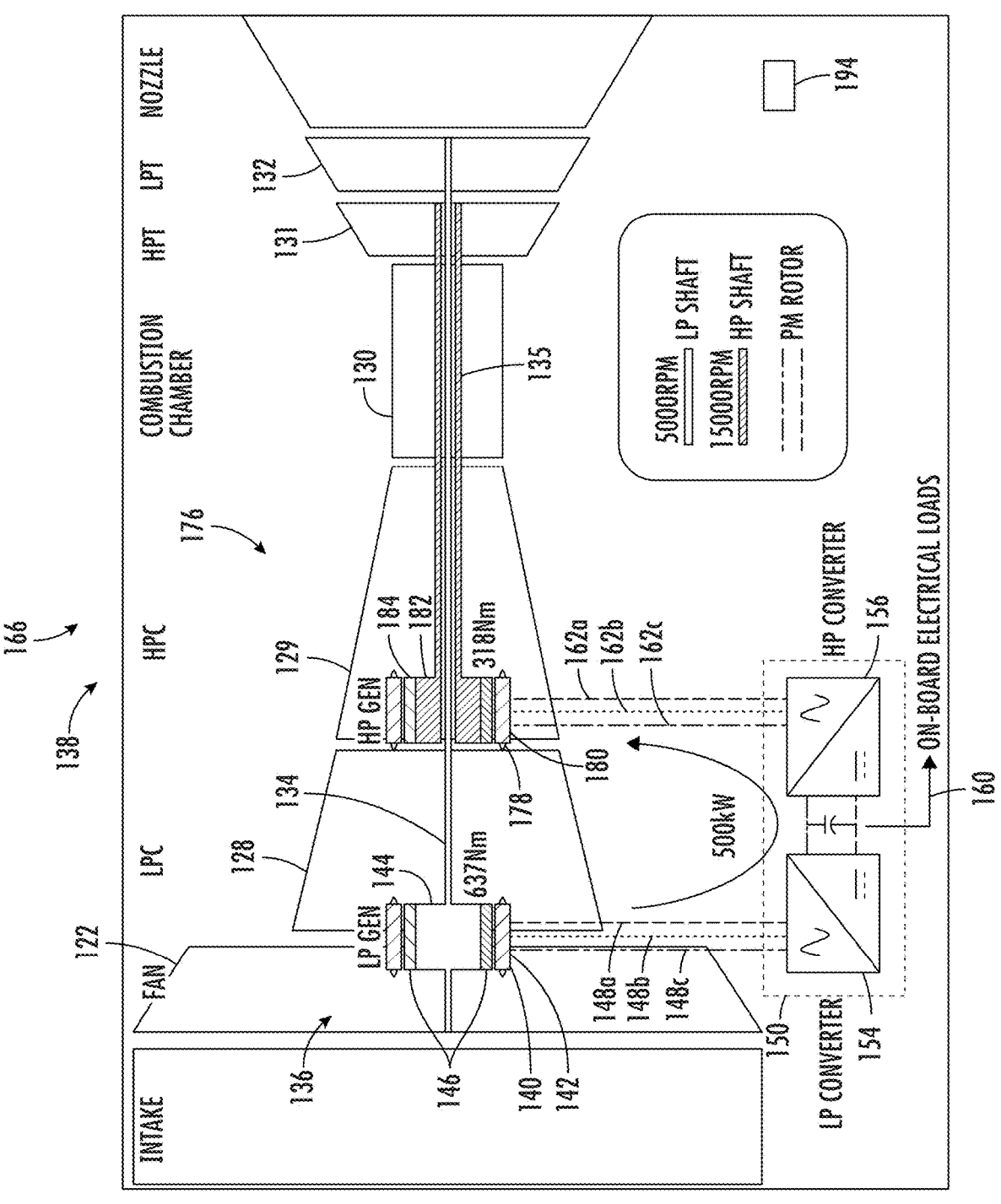
FIG. 6 is a schematic diagram of a conventional prior art system.

Turning now to FIG. 6, a conventional prior art system includes the first electric machine 136 coupled to rotate with the LP shaft 134, and a second electric machine 176. The second electric machine 176 includes a second stator 178 having at least one second winding 180, and a second rotor 182 having at least one second permanent magnet 184. The second stator 178 can be fixed to the gas turbine engine 120 such that it remains stationary relative to the rotating HP shaft 135. When operated as an electric generator, the second rotor 182 is configured to rotate in response to rotation of the HP shaft 135, where relative rotation of the at least one second permanent magnet 184 induces, via an electromagnetic interaction of the second stator 178 with the second rotor 182, an electric current in the at least one second winding 180 of the second electric machine 176. When operated as an electric motor, excitation of the at least one second winding 180 generates a magnetic field which interacts with the magnetic field of the at least one second permanent magnet 184. Interaction of the magnetic field creates a force upon the at least one second permanent magnet 184 which, in turn, creates a reactive force upon the HP shaft 135. The HP shaft 135 can be accelerated by using the second electric machine 176 as a motor, and can be decelerated by using the second electric machine 176 as a generator.

As illustrated in FIG. 6, when operating the first electric machine 136 as a motor, electric power can be delivered, via the AC/AC converter 150, to the second electric machine 176. A difference between the configuration of FIG. 6 relative to the configuration of the power transfer system 137 of FIG. 3 is that the same amount of power transfer of 500 kW can be split in FIG. 3 between direct shaft-to-shaft transfer as well as transfer via the AC/AC converter 150, while FIG. 6 requires all power to be transferred through the AC/AC converter 150. The AC/AC converter 150 of FIG. 6, therefore, must be built to handle greater power throughput. The configuration of FIG. 3, in contrast, can be built with lower power components which can provide weight and cost savings.

Figure 7:
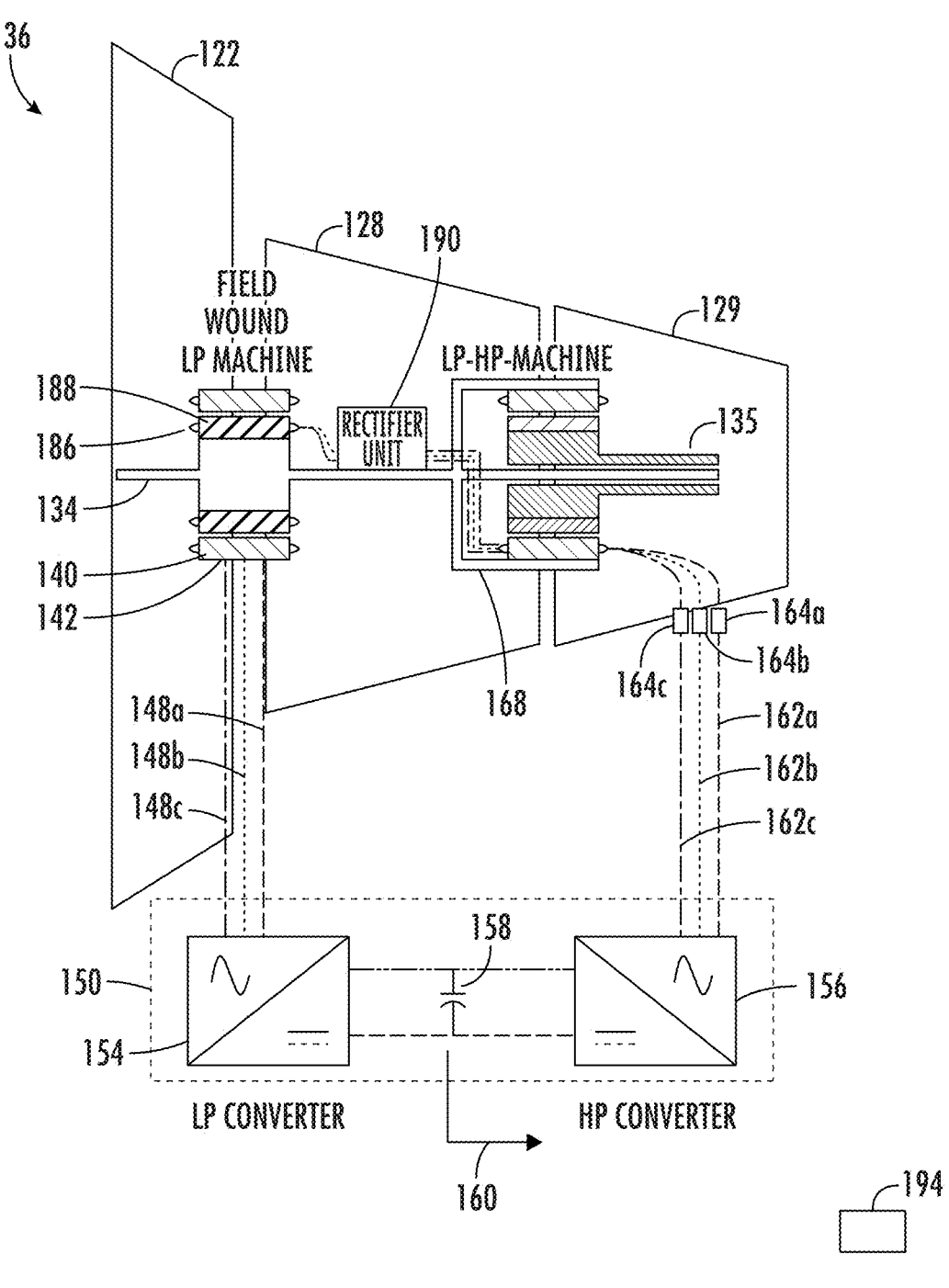
FIG. 7 is a schematic view of a power transfer system in accordance with an aspect of the present disclosure.

Turning now to FIG. 7, one embodiment of the first electric machine 136 is as a field wound machine in which the permanent magnet of FIG. 3 is replaced with a field wound rotor 186 having at least one field winding 188. The power transfer system 137 of FIG. 7 further includes a field converter 190 useful to convert AC power from the coupled winding 170 to a power useful to drive the field winding 188. In one form, the field converter 190 can convert AC power from the coupled winding 170 to a DC power. In the illustrated embodiment, the field converter 190 can receive power from three wires associated with the three phases of the coupled electric machine 152, and provide power via two wires to the field wound rotor 186. In one form, the two wires carry DC power from the field converter 190 to the at least one field winding 188.

Figure 8:
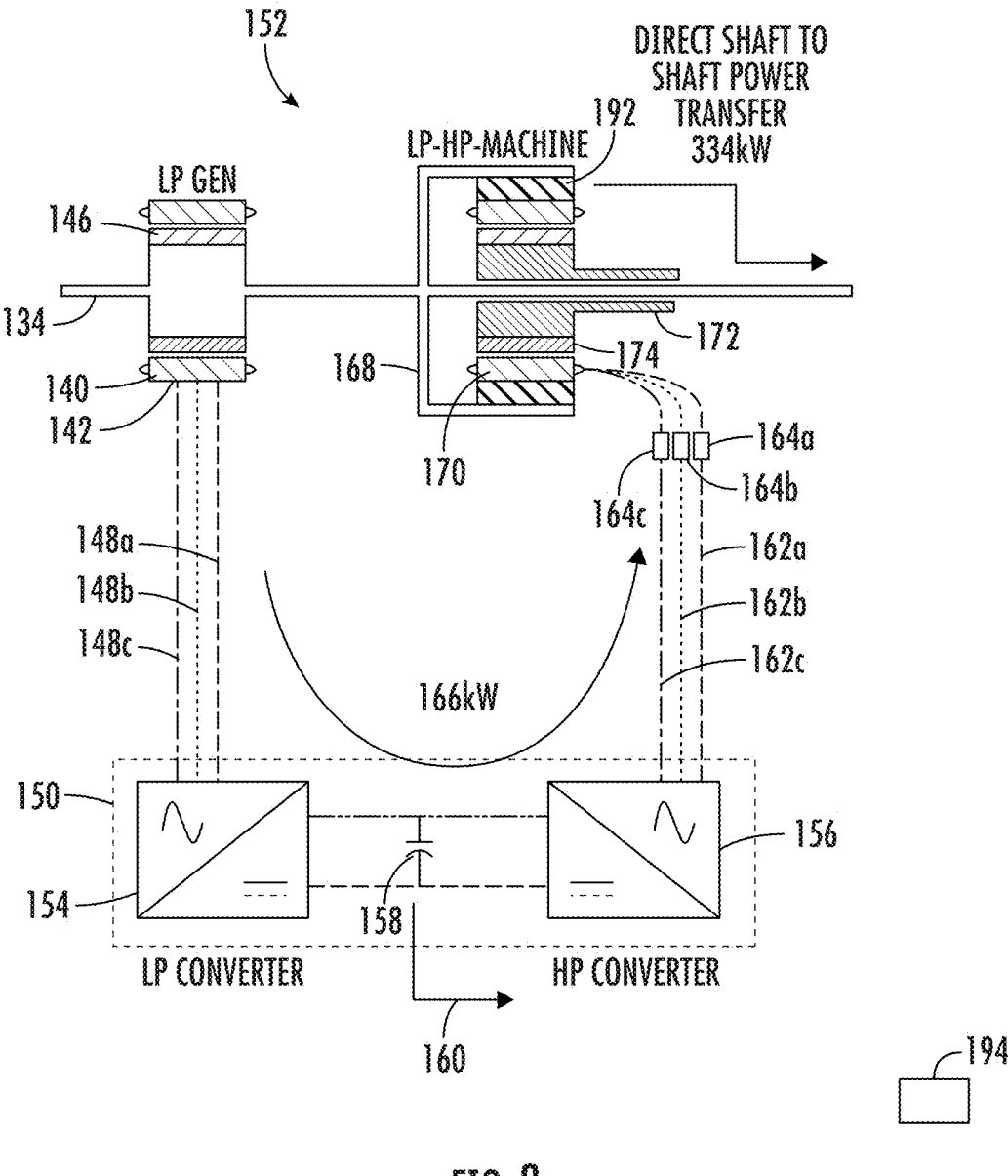
FIG. 8 is a schematic view of a power transfer system in accordance with an aspect of the present disclosure.

FIG. 8 depicts yet another embodiment of the power transfer system 137 in which a gearing 192 is integrated into the coupled electric machine 152 to convert a first speed of rotation of the LP shaft 134 to a second speed of rotation of the coupled winding 170 of the coupled electric machine 152. The gearing 192 can take any suitable form useful to provide any suitable speed ratio between the LP shaft 134 and the coupled winding 170 of the coupled electric machine 152. In one form, the speed ratio is 2:1 such that the LP shaft 134 rotates twice as fast as the coupled winding 170. In another form, the speed of rotation is 1:2 such that the LP shaft 134 rotates at half the speed of rotation of the coupled winding 170. The gearing 192 can take the form of any of a variety of various transmissions, including an epicyclic gearing (e.g., planetary gearing).

As illustrated in FIG. 8, and continuing with the same metric of power transfer from the LP shaft 134 of 500 kW, the addition of the gearing 192 results in a shaft-to-shaft transfer of power of 334 kW, with only 166 kW of power provided via the AC/AC converter 150 to the coupled electric machine 152. Thus, use of the gearing 192 can further reduce the total amount of power traversing through the AC/AC converter 150 which permits further use of yet lower power components relative to the embodiment depicted in FIGS. 3 and 6.

Features of each of the embodiments described above with each of FIGS. 3, 7, and 8, can be combined with other features of the embodiments described above with each of FIGS. 3, 7, and 8. For example, use of the field wound rotor 186 of FIG. 7 can be combined with the gearing 192 of FIG. 8.

Furthermore, although the various illustrated embodiments in each of each of FIGS. 3, 7, and 8 depict the coupled electric machine 152 receiving output power from the AC/AC converter 150, in some additional and/or alternative embodiments, the coupled electric machine 152 can receive output power from other power sources. For example, the coupled electric machine 152 can receive power from an energy storage device (e.g., a battery) that provides power to the coupled electric machine 152 via a DC/AC converter, which together, is akin to the DC link capacitor 158 and DC/AC converter 156.

In yet further embodiments, the gas turbine engine 120 can include electric machines (e.g., first electric machine 136) coupled to additional and/or alternative spools (e.g., an IP spool), and can include coupled electric machines (e.g., coupled electric machine 152) coupled to additional and/or alternative spools other than those depicted in the illustrated embodiments herein. For example, the first electric machine 136 can be coupled to the HP spool in lieu of or in addition to a first electric machine 136 coupled to the LP spool. Alternatively and/or additionally, the first electric machine 136 can be coupled to the IP spool.

In embodiments of the power transfer system 137 described herein, power can be extracted by the first electric machine 136 from the LP shaft 134 and delivered through the AC/AC converter 150 and via the coupled electric machine 152 to the HP shaft 135. In still further alternative and/or additional embodiments, power can be extracted by the coupled electric machine 152 from the HP shaft 135 and delivered through the AC/AC converter 150 and via the first electric machine 136 to the LP shaft 134. Given the above descriptions of alternative and/or additional embodiments, it will be appreciated that power can flow in any given direction, using any variety of electric machine coupled to any suitable shaft of the gas turbine engine in conjunction with a coupled electric machine between any two shafts.

Still further, the power transfer system 137 can include a controller 194 useful to regulate operation of the AC/AC converter 150 to facilitate conversion between AC power associated with the first electric machine 136 and AC power associated with the coupled electric machine 152. The controller 194 can thus be configured to operate discrete devices (e.g., switches) in one or more portions of the AC/AC converter 150 to facilitate the conversion between AC power. In some embodiments, the controller 194 can be integrated with an engine controller used to regulate operation of the gas turbine engine 120, while in other embodiments the controller 194 can be a standalone controller separate and apart from the engine controller. As will be appreciated, the engine controller can be a full authority digital engine controller (FADEC). The controller 194 can be configured to receive an input from, for example, the engine controller or any other suitable input device (e.g., pilot command) and operate upon the input to regulate operation of the AC/AC converter 150, first electric machine 136, and coupled electric machine 152. For example, if the engine controller is requested to quickly accelerate the HP spool in response to a performance demand, such as a rapid change in input as a result of a pilot command which results in a need for a rapid change in core power from the HP spool, the engine controller can send a request for power transfer from the LP shaft 134 to the HP shaft 135 to the controller 194. The controller 194, upon receipt of input from the engine controller, can regulate operation of the AC/AC converter 150 to extract power using the first electric machine 136 and coupled electric machine 152 as described above. In another alternative and/or additional example, the controller 194 can receive input from the engine controller to increase an operating margin of the gas turbine engine 120 which necessitates a power transfer from the LP shaft 134 to the HP shaft 135. The engine controller, in response to an operability demand, can provide an input to the controller 194 which corresponds to an amount of margin to be increased, in which the controller 194 can determine an amount of power transfer that corresponds to the amount of margin to be increased and commands the AC/AC converter 150 accordingly. Alternatively, the engine controller can provide an amount of power to be transferred between the LP shaft 134 and HP shaft 135, and in which the controller 194 adjusts operation of the AC/AC converter 150 to provide the requested transfer of power.

Figure 9:
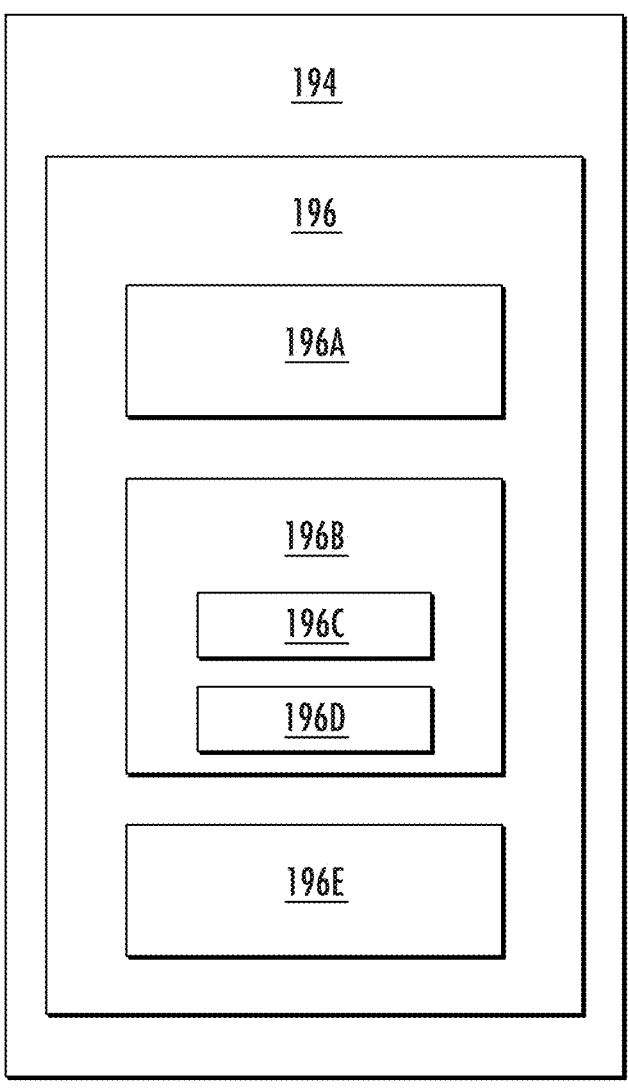
FIG. 9 is schematic view of a controller in accordance with an exemplary aspect of the present disclosure.

Referring particularly to FIG. 9, embodiments of the controller 194 will be described. In at least certain embodiments, the controller 194 can include one or more computing device(s) 196. The computing device(s) 196 can include one or more processor(s) 196A and one or more memory device(s) 196B. The one or more processor(s) 196A can include any suitable processing device, such as a microprocessor, microcontroller, integrated circuit, logic device, and/or other suitable processing device. The one or more memory device(s) 196B can include one or more computer-readable media, including, but not limited to, non-transitory computer-readable media, RAM, ROM, hard drives, flash drives, and/or other memory devices.

The one or more memory device(s) 196B can store information accessible by the one or more processor(s) 196A, including computer-readable instructions 196C that can be executed by the one or more processor(s) 196A. The instructions 196C can be any set of instructions that when executed by the one or more processor(s) 196A, cause the one or more processor(s) 196A to perform operations. In some embodiments, the instructions 196C can be executed by the one or more processor(s) 196A to cause the one or more processor(s) 196A to perform operations, such as any of the operations and functions for which the controller 194 and/or the computing device(s) 196 are configured, the operations for operating one or more aspects of the power transfer system 137, and/or any other operations or functions of the one or more computing device(s) 196. The instructions 196C can be software written in any suitable programming language or can be implemented in hardware. Additionally, and/or alternatively, the instructions 196C can be executed in logically and/or virtually separate threads on the one or more processor(s) 196A. The one or more memory device(s) 196B can further store data 196D that can be accessed by the one or more processor(s) 196A. For example, the data 196D can include data indicative of input, data indicative of operation of the AC/AC converter 150, data indicative of power flows between LP shaft 134 and HP shaft 135, data indicative of engine/aircraft operating conditions, and/or any other data and/or information described herein.

The computing device(s) 196 can also include a network interface 196E used to communicate, for example, with the other components of the aeronautical vehicle 100, including an engine controller. The network interface 196E can include any suitable components for interfacing with one or more network(s), including for example, transmitters, receivers, ports, controllers, antennas, and/or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Referring now to FIG. 10, it will be appreciated that the present disclosure may further provide for a method 198 of operating a power transfer system 137. The method 198 may be utilized with one or more of the power transfer systems 137 depicted in any of FIGS. 3, 7, and 8. In one exemplary aspect, the method 198 includes at 200 rotating a first pressure spool 138 of a gas turbine engine 120. The method 198 also includes at 202 that, as a result of rotating the first pressure spool 138, rotating a first coupled rotor 168 of a coupled electric machine 152, the coupled electric machine 152 having a second coupled rotor 172 in electromagnetic interaction with the first coupled rotor 168, the second coupled rotor 172 mechanically coupled to rotate with a second pressure spool 166 of the gas turbine engine 120. The method 198 also includes at 204 transferring a mechanical power from the first pressure spool 138 of the gas turbine engine 120 to the second pressure spool 166 via the electromagnetic interaction between first coupled rotor 168 and the second coupled rotor 172.

The exemplary method 198 of FIG. 10 can further include generating electric power with a first electric machine 136, the first electric machine 136 having a first rotor mechanically coupled to rotate with the first pressure shaft, and wherein the first pressure shaft is an LP shaft 134 of the gas turbine engine 120. Additionally, the exemplary method 198 of FIG. 10 can further include transferring the first electric power from the first electric machine 136 to the coupled electric machine 152 via an AC/AC converter 150. Additionally, the exemplary method 198 of FIG. 10 can further include wherein the first rotor 144 is a field wound rotor, and further comprising powering the field wound rotor of the first electric machine 136 from the first coupled rotor 168. Additionally and/or alternatively, the exemplary method 198 of FIG. 10 can further include converting, via a gearing 192, a first speed of rotation of the first pressure spool 138 to a second speed of rotation of a coupled winding 170 of the coupled electric machine 152. Additionally and/or alternatively, the exemplary method 198 of FIG. 10 can further include powering the coupled electric machine 152 using an energy storage device. Additionally and/or alternatively, the exemplary method 198 of FIG. 10 can further include mechanically powering the first electric machine 136 using an offtake shaft mechanically coupled with a shaft of the first pressure spool 138. Additionally and/or alternatively, the exemplary method 198 of FIG. 10 can further include controlling the AC/AC converter 150 using a controller 194 in response to a demand by a pilot for a change in power of the second pressure spool 166.

As will be appreciated, transferring power between spools of the gas turbine engine 120 is desired for management of the engine cycle, such as the operability and/or performance of the gas turbine engine 120. Architectures and controls of the present disclosure improve the efficiency and speed at which power can be transferred between the spools. Embodiments in FIGS. 3, 7, and 8 further provide improved efficiency and speed at which power is transferred between the spools.

Further aspects are provided by the subject matter of the following clauses:

A power transfer system, the power transfer system comprising: a first pressure spool of a gas turbine engine structured to rotate and compress a working fluid to a first pressure; a second pressure spool of a gas turbine engine structured to rotate and compress the working fluid to a second pressure different than the first pressure; and a coupled electric machine configured to transfer mechanical power between the first pressure spool and the second pressure spool, the coupled electric machine having; a first coupled rotor coupled to rotate with the first pressure spool; and a second coupled rotor coupled to rotate with the first pressure spool; wherein during operation of the coupled electric machine the first pressure spool is electromagnetically coupled with the second pressure spool via the coupled electric machine.

The power transfer system of the preceding clause, wherein the first pressure spool includes a first electric machine.

The power transfer system of any of the preceding clauses, wherein the coupled electric machine is configured to receive electrical power from the first electrical machine.

The power transfer system of any of the preceding clauses, further comprising an AC/AC electric converter configured to transfer power between the first electric machine and the coupled electric machine.

The power transfer system of any of the preceding clauses, further comprising slip rings configured to electrically couple the first coupled rotor to the AC/AC electric converter.

The power transfer system of any of the preceding clauses, wherein the gas turbine engine includes an intermediate pressure spool.

The power transfer system of any of the preceding clauses, wherein the first electric machine includes a first rotor, the first rotor being a field wound rotor.

The power transfer system of any of the preceding clauses, wherein the field wound rotor is in electrical connection with the first coupled rotor.

The power transfer system of any of the preceding clauses, further comprising a power converter configured to receive electric current from the first coupled rotor and deliver the electric current to the field wound rotor.

The power transfer system of any of the preceding clauses, further comprising a gearing that rotatingly couples the first pressure spool to the first coupled rotor, wherein the gearing is structured to convert a first speed of rotation of the first pressure spool to a second speed of rotation of a coupled winding of the coupled electric machine.

The power transfer system of any of the preceding clauses, wherein the AC/AC converter includes an AC/DC converter structured to receive an AC power from the first electric machine, the AC/AC converter including a DC/AC converter structured to receive a DC power from the AC/DC converter and convert the DC power to AC power, the AC/AC converter further configured to provide the AC power to the coupled electric machine.

The power transfer system of any of the preceding clauses, wherein the first electric machine includes a first rotor configured to rotate with the first pressure spool, the first rotor being a permanent magnet.

The power transfer system of any of the preceding clauses, wherein the first coupled rotor includes a first winding.

The power transfer system of any of the preceding clauses, wherein the second coupled rotor includes a permanent magnet.

The power transfer system of any of the preceding clauses, further comprising an electric machine controller.

The power transfer system of any of the preceding clauses, further comprising an electric switch, the electric switch having an operational configuration characterized by an open state and a closed state, the electric switch configured to be controlled by the electric machine controller, the open state defining a condition in which no electric power is transferred between the second coupled rotor and the second converter.

The power transfer system of any of the preceding clauses, wherein the controller is configured to separately operate any of the coupled electric machine, first electric machine, and second electric machine.

The power transfer system of any of the preceding clauses, further comprising a power bus configured to receive electric power from the first electric machine and the second electric machine.

A gas turbine engine having a first pressure spool and a second pressure spool; and a dual rotor electric machine having a first rotor coupled to rotate with the first pressure spool and a second rotor coupled to rotate with the second pressure spool, the dual rotor electric machine configured to transfer mechanical work between the first pressure spool and the second pressure spool via electromagnetic interaction of the first rotor and the second rotor.

A power transfer system, the power transfer system comprising: a first pressure spool of a gas turbine engine structured to rotate and compress a working fluid to a first pressure; a second pressure spool of a gas turbine engine structured to rotate and compress the working fluid to a second pressure different than the first pressure; and a coupled electric machine having a first coupled rotor and a second coupled rotor, the coupled electric machine configured to transfer a mechanical power between the first pressure spool and the second pressure spool via electromagnetic interaction between the first coupled rotor and the second coupled rotor.

The power transfer system of the preceding clause, wherein the first pressure spool includes a first electric machine having a first stator and a first rotor.

The power transfer system of any of the preceding clauses, wherein the first coupled rotor includes a winding in electrical connection with a winding of the first rotor.

The power transfer system of any of the preceding clauses, further comprising an AC/AC electric converter configured to transfer power between the first electric machine and the coupled electric machine.

The power transfer system of any of the preceding clauses, wherein a first turbine of the first pressure spool generates a first mechanical power, wherein the mechanical power transferred between the first pressure spool and the second pressure spool via electromagnetic interaction between the first coupled rotor and the second coupled rotor is a first portion of the first mechanical power, and wherein a second portion of the first mechanical power is transferred between the first pressure spool and the second pressure spool via the AC/AC electric converter.

The power transfer system of any of the preceding clauses, wherein the AC/AC converter includes an AC/DC converter structured to receive an AC power from the first electric machine, the AC/AC converter including a DC/AC converter structured to receive a DC power from the AC/DC converter and convert the DC power to AC power, the AC/AC converter further configured to provide the AC power to the coupled electric machine.

The power transfer system of any of the preceding clauses, wherein the first electric machine includes a first rotor configured to rotate with the first pressure spool, the first rotor being a permanent magnet.

The power transfer system of any of the preceding clauses, wherein the first coupled rotor includes a first winding.

The power transfer system of any of the preceding clauses, wherein the second coupled rotor includes a permanent magnet.

The power transfer system of any of the preceding clauses, further comprising an electric machine controller.

The power transfer system of any of the preceding clauses, further comprising an electric switch, the electric switch having an operational configuration characterized by an open state and a closed state, the electric switch configured to be controlled by the electric machine controller, the open state defining a condition in which no electric power is transferred between the second coupled rotor and the second converter.

The power transfer system of any of the preceding clauses, wherein the controller is configured to separately operate any of the coupled electric machine, first electric machine, and second electric machine.

The power transfer system of any of the preceding clauses, further comprising a power bus configured to receive electric power from the first electric machine and the second electric machine.

A method of operating a power transfer system, the method comprising: rotating a first pressure spool of a gas turbine engine; as a result of rotating the first pressure spool, rotating a first coupled rotor of a coupled electric machine, the coupled electric machine having a second coupled rotor in electromagnetic interaction with the first coupled rotor, the second coupled rotor mechanically coupled to rotate with a second pressure spool of the gas turbine engine; and transferring a mechanical power from the first pressure spool of the gas turbine engine to the second pressure spool via the electromagnetic interaction between first coupled rotor and the second coupled rotor.

The method of the preceding clause, further comprising generating a first electric power with a first electric machine, the first electric machine having a first rotor mechanically coupled to rotate with the first pressure spool, and wherein a first pressure shaft is an LP shaft of the gas turbine engine.

The method of any of the preceding clauses, further comprising transferring the first electric power from the first electric machine to the coupled electric machine via an AC/AC converter.

The method of any of the preceding clauses, wherein the first rotor is a field wound rotor, and further comprising powering the field wound rotor of the first electric machine from the first coupled rotor.

The method of any of the preceding clauses, further comprising converting, via a gearing, a first speed of rotation of the first pressure spool to a second speed of rotation of a coupled winding of the coupled electric machine.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:
1. A power transfer system, the power transfer system comprising:
  a first pressure spool of a gas turbine engine structured to rotate and compress a working fluid to a first pressure;
  a second pressure spool of a gas turbine engine structured to rotate and compress the working fluid to a second pressure different than the first pressure; and
  a coupled electric machine configured to transfer mechanical power between the first pressure spool and the second pressure spool, the coupled electric machine having:
    a first coupled rotor coupled to rotate with the first pressure spool; and
    a second coupled rotor coupled to rotate with the second pressure spool;
  wherein, the coupled electric machine is configured such that, during operation thereof, the first pressure spool is electromagnetically coupled with the second pressure spool via the coupled electric machine.

2. The power transfer system of claim 1, wherein the first pressure spool includes a first electric machine.

3. The power transfer system of claim 2, wherein the coupled electric machine is configured to receive electrical power from the first electric machine.

4. The power transfer system of claim 2, further comprising an AC/AC electric converter configured to transfer power between the first electric machine and the coupled electric machine.

5. The power transfer system of claim 4, further comprising slip rings configured to electrically couple the first coupled rotor to the AC/AC electric converter.

6. The power transfer system of claim 1, wherein the gas turbine engine includes an intermediate pressure spool.

7. The power transfer system of claim 2, wherein the first electric machine includes a first rotor, the first rotor being a field wound rotor.

8. The power transfer system of claim 6, wherein the field wound rotor is in electrical connection with the first coupled rotor.

9. The power transfer system of claim 8, further comprising a power converter configured to receive electric current from the first coupled rotor and deliver the electric current to the field wound rotor.

10. The power transfer system of claim 1, further comprising a gearing that rotatingly couples the first pressure spool to the first coupled rotor, wherein the gearing is structured to convert a first speed of rotation of the first pressure spool to a second speed of rotation of a coupled winding of the coupled electric machine.

11. A power transfer system, the power transfer system comprising:
  a first pressure spool of a gas turbine engine structured to rotate and compress a working fluid to a first pressure;
  a second pressure spool of a gas turbine engine structured to rotate and compress the working fluid to a second pressure different than the first pressure; and
  a coupled electric machine having a first coupled rotor and a second coupled rotor, the coupled electric machine configured to transfer a mechanical power between the first pressure spool and the second pressure spool via electromagnetic interaction between the first coupled rotor and the second coupled rotor.

12. The power transfer system of claim 11, wherein the first pressure spool includes a first electric machine having a first stator and a first rotor.

13. The power transfer system of claim 12, wherein the first coupled rotor includes a winding in electrical connection with a winding of the first rotor.

14. The power transfer system of claim 12, further comprising an AC/AC electric converter configured to transfer power between the first electric machine and the coupled electric machine.

15. The power transfer system of claim 14, wherein a first turbine of the first pressure spool generates a first mechanical power, wherein the mechanical power transferred between the first pressure spool and the second pressure spool via electromagnetic interaction between the first coupled rotor and the second coupled rotor is a first portion of the first mechanical power, and wherein a second portion of the first mechanical power is transferred between the first pressure spool and the second pressure spool via the AC/AC electric converter.

16. A method of operating a power transfer system, the method comprising:

rotating a first pressure spool of a gas turbine engine;

as a result of rotating the first pressure spool, rotating a first coupled rotor of a coupled electric machine, the coupled electric machine having a second coupled rotor in electromagnetic interaction with the first coupled rotor, the second coupled rotor mechanically coupled to rotate with a second pressure spool of the gas turbine engine; and transferring a mechanical power from the first pressure spool of the gas turbine engine to the second pressure spool via the electromagnetic interaction between first coupled rotor and the second coupled rotor.

17. The method of claim 16, further comprising generating a first electric power with a first electric machine, the first electric machine having a first rotor mechanically coupled to rotate with the first pressure spool, and wherein a first pressure shaft is an LP shaft of the gas turbine engine.

18. The method of claim 17, further comprising transferring the first electric power from the first electric machine to the coupled electric machine via an AC/AC converter.

19. The method of claim 17, wherein the first rotor is a field wound rotor, and further comprising powering the field wound rotor of the first electric machine from the first coupled rotor.

20. The method of claim 16, further comprising converting, via a gearing, a first speed of rotation of the first pressure spool to a second speed of rotation of a coupled winding of the coupled electric machine.

* * * * *